July 28, 1925.　　　　　　　　　　　　　　　　　1,547,360
T. B. BYRD
TRACTOR SAW
Filed Dec. 23, 1924　　　　2 Sheets-Sheet 2

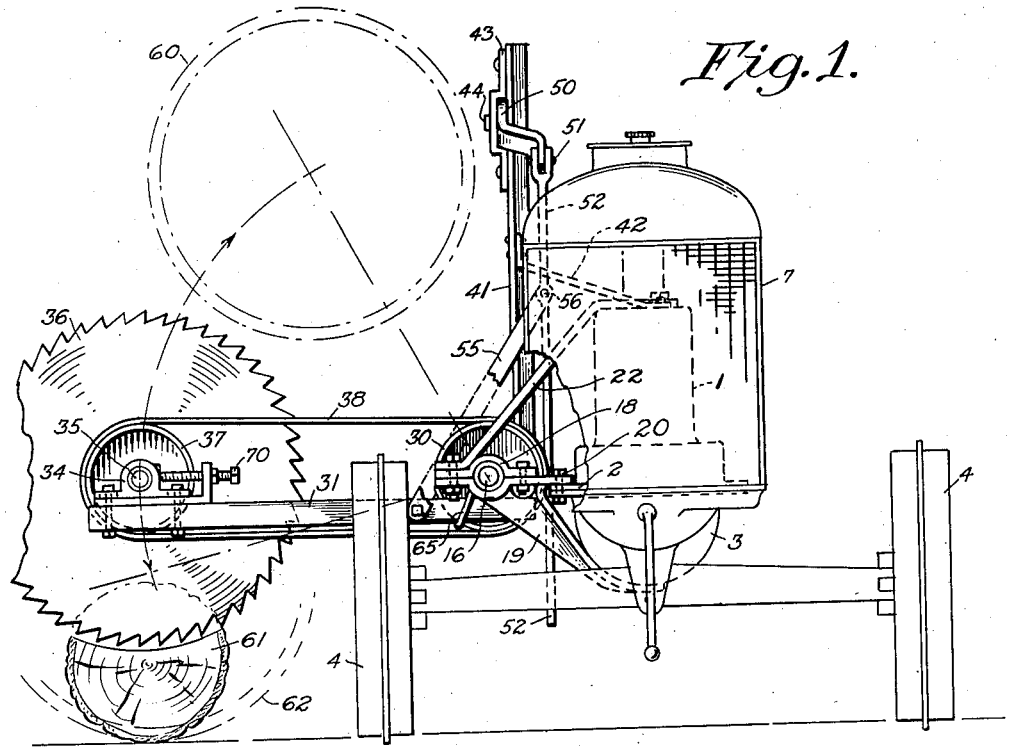

INVENTOR
Thomas B. Byrd
BY F. A. Witherspoon
ATTORNEY

Patented July 28, 1925.

1,547,360

UNITED STATES PATENT OFFICE.

THOMAS B. BYRD, OF POPLARVILLE, MISSISSIPPI.

TRACTOR SAW.

Application filed December 23, 1924. Serial No. 757,649.

*To all whom it may concern:*

Be it known that I, THOMAS B. BYRD, a citizen of the United States, residing at Poplarville, in the county of Pearl River and State of Mississippi, have invented certain new and useful Improvements in Tractor Saws; and I do hereby declare the following to be a full, clear, and exact description of the invention, such as will enable others skilled in the art to which it appertains to make and use the same.

This invention relates to saw attachments for tractors and has for its object to provide a construction which is stronger and more efficient, as well as more adaptable, than those heretofore proposed.

With these and other objects in view, the invention consists in the novel details of construction and arrangement of parts more fully hereinafter disclosed and particularly pointed out in the claims.

Referring to the drawings forming a part of this specification, in which like numerals designate like parts in all the views,—

Figure 1 is a front elevational view illustrating the attachment of the device to a tractor;

Figure 2 is a top plan view of the parts shown in Fig. 1;

Figure 3:
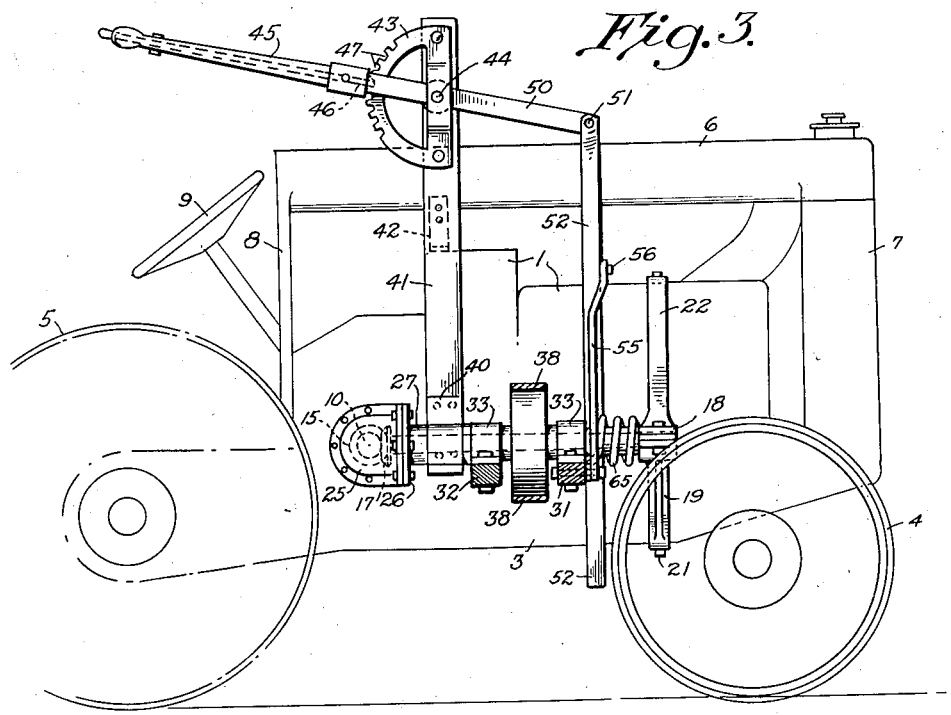
Figure 3 is a sectional view taken on the line 3—3 of Fig. 2 and looking in the direction of the arrows.

1 indicates the engine block of the tractor mounted upon the framework 2, carrying the usual crank case 3, the whole mounted for tractability as by means of the front wheels 4 and the rear driving wheels 5. Above the engine block 1 is supported the fuel tank 6, as by means of the radiator frame 7 at one end thereof and the dash construction 8 at the other end thereof, while 9 is the usual steering wheel.

As is well known, in the present tractor construction the transmission drive shaft deriving its power from the engine shaft through the medium of a clutch is supplied with a bevel gear adapted to enmesh with a second bevel gear mounted upon a stub shaft 10 leading at substantially a right angle from the transmission drive shaft and adapted to protrude through the side casing of the tractor in such a manner that a pulley or other suitable connection might be made to the free end of said stub shaft. This construction will be seen to utilize the power of the tractor engine in driving auxiliary apparatus. Where this stub shaft 10 extends through the casing 11 of the tractor, there is provided a housing 12 provided with a cover plate.

In this invention, it is the purpose to provide a construction adapted to be attached to the side of the tractor and to derive power from the stub shaft 10. To this end, the cover plate is removed and a bevel gear 15 attached to the outer end of the stub shaft 10. 16 is a shaft supplied at one end with a bevel gear 17 meshing with the bevel gear 15, said shaft 16 mounted at its other end in a journal 18 provided by the T-bracket member 19 bolted as at 20 to the engine base 2, and fastened as at 21 to the underneath portion of the crank case 3. Said journal is braced as by the member 22 to the top of the cylinder block 1. A housing 25 is suitably secured to the end of the housing 12 to suitably protect the enmeshed gears 15 and 17, and is provided with the facing plate 26 providing the bearing 27 for the rear end of the shaft 16.

About midway of the shaft 16 is mounted the pulley 30 adapted to rotate with said shaft. On either side of the pulley 30 are two identical frame members 31 and 32 secured to the shaft 16, as by the strap bearings 33. The outward end of the frame members 31 and 32 are provided with adjustable bearings or journals 34 for the reception of the shaft 35 carrying the circular saw 36 on one end thereof and provided with the pulley 37 between the frame members 31 and 32 and adapted to be driven as by the belt 38 from the pulley 30 mounted on the shaft 16.

From what has just been disclosed it will thus be seen that there has been provided a saw attachment for tractors, said saw 36 being mounted on the shaft 35 provided with the pulley 37 driven by the belt 38 from the pulley 30 mounted on the shaft 16 which derives its power from the stub shaft 10 of the tractor through the bevel gears 15 and 17.

Between the side frame member 32 and the face plate bearing 26, there is mounted on the shaft 16 a suitable bracket or collar 40 to which is fastened the lowermost end of a vertically disposed upright 41 preferably made from angle iron, which is braced as at 42 to the top of the cylinder block 1. The upper end of this vertical support 41 is provided with a notched sector 43 to which is pivoted, as at 44, the hand lever 45 provided with the usual spring-controlled latch 46 adapted to take into the notches 47 of the sector 43. The hand lever 45 is extended, as at 50, on the opposite side of the sector 43 and has pivoted to the end thereof, as at 51, the upper end of a vertically-disposed guide rod 52 which passes down through the guide aperture 53 provided in the extension 54 of the bracket member 19. This guide rod 52 and the hand lever 45 constitute, with the link 55, a hoisting means by which the saw 36 and its associated frame is rotated about the shaft 16 as the center. That is to say, when the tractor is not in use sawing logs, etc., the handle of the hand lever 45 is brought down to its lowermost position in which it is fastened by the latch 46, thus raising the guide rod 52 which in turn, through the link 55 pivoted thereto as at 56, swings the saw 36 and its frame upwardly to such a position as is indicated by the dashed circle 60 in Fig. 1. However, when it is desired to operate the saw, the tractor is driven alongside a log 61 or other material to be sawed, as indicated in Fig. 1, and the hand lever 45 operated in a reverse direction to lower the saw 36 from the position indicated at 60, to contact with the log 61, power in the meantime having been transmitted through the shafts 10 and 16 and belt 38 to the saw shaft 35. The saw and its frame is thereby enabled to saw through the log 61 and reach a position as indicated by the dash lines 62 of Fig. 1.

The saw 36 and its associated frame has considerable weight and therefore a spring 65 is interposed between the T-bracket member 19 and the adjacent frame member 31 to relieve the operator of part of this weight. That is to say, the operator of the tractor would ordinarily without the aid of such a spring be required to exert considerable pressure on the hand lever 45 to raise the saw 36 and its frame. By the aid of a heavy duty spring, such as indicated at 65, the greater portion of the weight of the saw and its frame is equalized, thereby making the operation of the parts through the medium of the hand lever 45, much easier.

With particular reference to Figs. 1 and 2, it will be seen that at the outer extremities of the frame members 31 and 32, are the bearings 34 for the shaft 35. In order that the belt 38 may always be kept at the proper tension on the pulleys 30 and 37, the shaft 35 carrying the latter named pulley may be adjusted as by the take-up screws 70 operating on the bearings 34 in the usual and well known manner.

Figure 4:
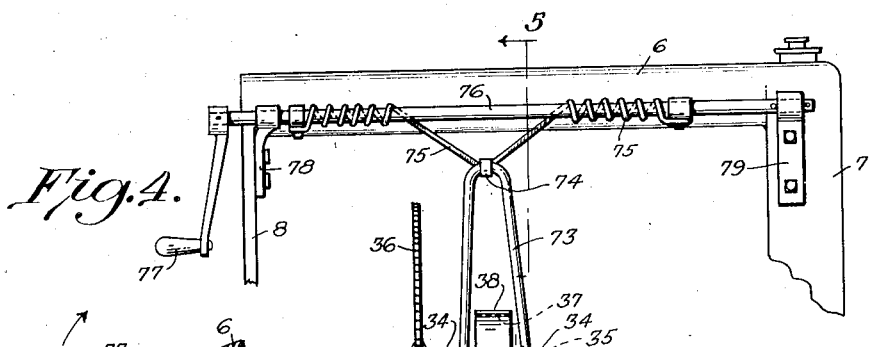
Figure 4 is a modified form of elevating apparatus for hoisting the saw attachment.
Figure 5:
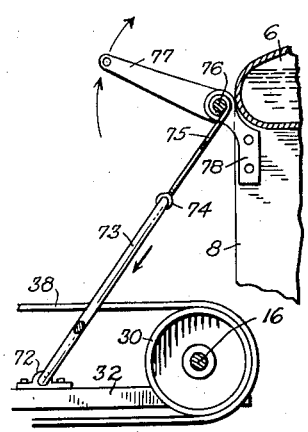
Figure 5 is a sectional view taken on the line 5—5 of Fig. 4 and looking in the direction of the arrows.

Coming now to Figs. 4 and 5, there is disclosed a modified form of hoisting means. This means comprises the brackets 72 mounted on the frame members 31 and 32 and adapted to take the lower outwardly bent ends of the yoke 73, to which is attached as at 74, any suitable flexible medium such as rope 75 adapted to be wound around the rod 76 by means of the crank 77. The rod 76 is suitably supported at the top of the tractor as by the bracket 78 attached to the dash 8, and the bracket 79 at the opposite end attached to the radiator frame 7. This well known method need not further be described, as it is the usual windlass method of take-up and therefore it will suffice to say that upon the rotation of the crank 77 in the direction of the arrows in Fig. 5, the saw and its associated frame will be lowered in the direction indicated, oscillating about the shaft 16 as a center.

From the foregoing, it will thus be clear that there is provided in this invention an attachment for a tractor which may be oscillated in a vertical direction about a center located within the limits of the tractor, and that the entire mechanism is operable from the driver's seat. Further, it will be noted that a large percentage of the weight of the saw and its associated frame is equalized by the heavy duty spring 65, thus relieving the operator of much energy required by the raising of the saw and its parts.

It is obvious that those skilled in the art may vary the details of construction as well as the combinations of parts without departing from the spirit of the invention, and therefore it is not wished to be limited to the disclosure above except as may be required by the claims.

What is claimed is:—

1. In an apparatus of the class described, the combination of a tractor provided with a stub shaft having a bevel gear for transmitting power, also an engine, and an engine base; an upper brace member secured to said engine; a vertical support secured to said upper brace member and provided with a shaft receiving collar; a shaft passing through said collar and provided at one end with a bevel gear meshing with said first-named gear; a bracket supporting the other end of said shaft and secured to said engine base; a pair of frame members, supported for oscillation at one end around said shaft; means for supporting a second shaft on the other end of said frame members; a pulley fast on said first-named shaft; a pulley fast on said second-named shaft; a belt connecting said pulleys; a tool mounted on said second shaft; and means to oscillate said tool about said first-named shaft.

2. In an apparatus of the class described, the combination of a tractor provided with a stub shaft having a bevel gear for transmitting power, also an engine, and an engine base; an upper brace member secured to said engine; a vertical support secured to said upper brace member and provided with a shaft receiving collar; a notched sector carried by said vertical support; a shaft passing through said collar and provided at one end with a bevel gear meshing with said first-named gear; a bracket supporting the other end of said shaft and secured to said engine base; a pair of frame members, supported for oscillation at one end around said shaft; means for supporting a second shaft on the other end of said frame members; a pulley fast on said first-named shaft; a pulley fast on said second named shaft; a belt connecting said pulleys; a tool mounted on said second shaft; and means associated with said sector to oscillate said tool about said first-named shaft.

3. In an apparatus of the class described, the combination of a tractor provided with a stub shaft having a bevel gear for transmitting power, also an engine and an engine base; an upper brace member secured to said engine; a vertical support secured to said upper brace member and provided with a shaft receiving collar at one end; a notched sector carried by said vertical support at the other end thereof; a shaft passing through said collar and provided at one end with a bevel gear meshing with said first named gear; a bracket supporting the other end of said shaft and secured to said engine base; a pair of frame members supported for oscillation at one end around said shaft; a link associated with one of said frame members; means for supporting a second shaft on the other end of said frame members; a pulley fast on said first-named shaft; a pulley fast on said second-named shaft; a belt connecting said pulleys; a tool mounted on said second shaft; and means associated with said sector, comprising a lever, a guide rod and said link, to oscillate said tool about said first-named shaft.

4. In an apparatus of the class described, the combination of a tractor provided with a stub shaft having a bevel gear for transmitting power, also an engine, and an engine base; an upper brace member secured to said engine; a vertical support secured to said upper brace member and provided with a shaft receiving collar at one end; a notched sector carried by said vertical support at the other end thereof; a shaft passing through said collar and provided at one end with a bevel gear meshing with said first-named gear; a bracket provided with a guide aperture supporting the other end of said shaft and secured to said engine base; a pair of frame members, supported for oscillation at one end around said shaft; means for supporting a second shaft on the other end of said frame members; a pulley fast on said first-named shaft; a pulley fast on said second-named shaft; a belt connecting said pulleys; a tool mounted on said second shaft; a link pivoted at one end to one of said frame members disposed in said aperture; and means comprising a lever, pivoted to said sector and connected at one end to the said guide rod to oscillate said tool about said first-named shaft.

5. In an apparatus of the class described, the combination of a tractor provided with a stub shaft having a bevel gear for transmitting power, also an engine, an engine base, and a crank-case; a shaft provided at one end with a bevel gear meshing with said first-named gear; a T-bracket supporting the other end of said shaft and secured to said engine base; an upper brace member secured to said engine at one end and to said bracket at the other end; a pair of frame members supported for oscillation at one end around said shaft; a second shaft supported at the other end of said frame members; a pulley fast on said first-named shaft; a pulley fast on said second-named shaft; a belt connecting said pulleys; a tool mounted on said second shaft; and means to oscillate said tool about said first-named shaft.

6. In an apparatus of the class described, the combination of a tractor provided with a stub shaft having a bevel gear for transmitting power, also an engine, an engine base, and a crank-case; a shaft provided at one end with a bevel gear meshing with said first-named gear; a housing for said gears constituting a bearing for said shaft; a T-bracket provided with a lower brace member secured to said crank-case, said bracket supporting the other end of said shaft and secured to said engine base; an upper brace member secured to said engine at one end and to said bracket at the other end; a pair of frame members supported for oscillation at one end around said shaft; a second shaft adjustably supported at the other end of said first-named shaft; a pulley fast on said second-named shaft; a belt connecting said pulleys; a tool mounted on said second shaft; and means to oscillate said tool about said first-named shaft.

7. In an apparatus of the class described, the combination of a tractor provided with a stub shaft having a bevel gear for transmitting power, also an engine, an engine base, and a crank-case; a shaft provided at one end with a bevel gear meshing with said first-named gear; a vertical support secured to said shaft and to said engine; a T-bracket provided with a lower brace member secured to said crank-case, said bracket supporting the other end of said shaft and secured to said engine base; an extension to said bracket provided with an aperture; an upper brace member secured to said engine at one end and to said bracket at the other end; a pair of frame members supported for oscillation at one end around said shaft; a second shaft adjustably supported at the other end of said frame members; a pulley fast on said first-named shaft and intermediate said frame members; a pulley fast on said second-named shaft and intermediate said frame members; a belt connecting said pulleys; a tool mounted on said second shaft; and means associated with said vertical support and said aperture to oscillate said tool about said first-named shaft.

8. In an apparatus of the class described, the combination of a tractor provided with a stub shaft having a bevel gear for transmitting power, also an engine, an engine base, and a crank-case; a shaft provided at one end with a bevel gear meshing with said first-named gear; a T-bracket supporting the other end of said shaft and secured to said engine base; an upper brace member secured to said engine at one end and to said bracket at the other end; a pair of frame members supported for oscillation at one end around said shaft; a second shaft supported at the other end of said frame members; a pulley fast on said first-named shaft; a pulley fast on said second-named shaft; a belt connecting said pulleys; a tool mounted on said second shaft; an equalizing spring interposed between said bracket and one of said frame members; and means comprising a lever, support, guide rod and connecting link to oscillate said tool about said first-named shaft.

In testimony whereof I affix my signature.

THOMAS B. BYRD.